United States Patent [19]

Kawamata et al.

[11] Patent Number: 5,489,009

[45] Date of Patent: Feb. 6, 1996

[54] VIBRATION DAMPING DEVICE

[75] Inventors: Satoru Kawamata, Higashimurayama; Isao Watanabe, Iruma; Kiyoshi Ohno, Kodaira, all of Japan

[73] Assignee: Bridgestone Corporation, Tokyo, Japan

[21] Appl. No.: 471,269

[22] Filed: Jun. 6, 1995

Related U.S. Application Data

[62] Division of Ser. No. 302,446, Sep. 12, 1994, Pat. No. 5,477,946, which is a continuation of Ser. No. 765,224, Sep. 25, 1991, abandoned.

[30] Foreign Application Priority Data

Sep. 25, 1990 [JP] Japan ................................ 2-251798
Feb. 6, 1991 [JP] Japan ................................ 3-35145

[51] Int. Cl.⁶ ........................................................ F16F 9/04
[52] U.S. Cl. ........................ 188/267; 188/298; 267/64.24; 267/122
[58] Field of Search ............................. 188/267, 298, 188/287, 322.15, 268; 267/64.21, 64.24, 64.27, 122, 140.11, 140.12, 140.13, 140.14, 140.15, 219, 220

[56] References Cited

U.S. PATENT DOCUMENTS

| | | |
|---|---|---|
| 1,729,565 | 9/1929 | Caretta . |
| 2,688,150 | 9/1954 | Roussel . |
| 2,846,983 | 8/1958 | Otto . |
| 3,046,003 | 7/1962 | Schultz . |
| 4,572,488 | 2/1986 | Holmberg, Jr. et al. . |
| 4,720,087 | 1/1988 | Duclos et al. . |
| 4,854,555 | 8/1989 | Ohkawa et al. . |
| 5,180,145 | 1/1993 | Watanabe et al. . |
| 5,316,112 | 5/1994 | Kimura et al. ............. 188/267 |
| 5,366,048 | 11/1994 | Watanabe et al. . |

FOREIGN PATENT DOCUMENTS

| | | |
|---|---|---|
| 0298266 | 7/1987 | European Pat. Off. . |
| 0300445 | 1/1989 | European Pat. Off. . |
| 414508 | 2/1991 | European Pat. Off. . |
| 0414508 | 2/1991 | European Pat. Off. . |
| 2579283 | 3/1985 | France . |
| 754307 | 11/1993 | France . |
| 466352 | 7/1975 | U.S.S.R. . |
| 255873 | 2/1927 | United Kingdom . |
| 845539 | 8/1960 | United Kingdom . |

OTHER PUBLICATIONS

Patent Abstracts of Japan, vol. 4, No. 161 (M-40)(643) Nov. 11, 1980.
Patent Abstracts of Japan, vol. 9, No. 223 (M-411)(1946) Sep. 10, 1985.

*Primary Examiner*—Douglas C. Butler
*Attorney, Agent, or Firm*—Sughrue, Mion, Zinn, Macpeak & Seas

[57] ABSTRACT

A vibration damping device comprises two cylindrical and flexible membrane members liquid-tightly connected at its end portion to respective end portion of a piston member and at its other end portions to respective face plates, a connecting member connecting the face plates to each other to form a closed chamber, a liquid filled in the closed chamber, and fastening members arranged onto the piston member and face plate, respectively. Moreover, at least one restricted passage is formed in the piston member or the connecting member. When an electrorheological fluid is used as a liquid, electrodes are arranged on opposed walls of the restricted passage.

16 Claims, 9 Drawing Sheets

FIG_1a

FIG_1b

FIG_2

FIG_3a

FIG_3b

FIG_3c

FIG_4

FIG_5a

FIG_5b

FIG_5c

FIG_5d

FIG_7a

FIG_7b

FIG_7c

FIG_7d

FIG_8

FIG. 9

VIBRATION DAMPING DEVICE

This is a divisional of application Ser. No. 08/302,446 filed Sep. 12, 1994, to issue as U.S. Pat. No. 5,477,946 which is a continuation of application Ser. No. 07/765,224 filed Sep. 25, 1991, now abandoned.

BACKGROUND OF THE INVENTION

1. Field of the Invention

This invention relates to a vibration damping device suitable for use in an automobile suspension system and the like and capable of developing a high vibration damping performance.

2. Disclosure of the Related Art

For example, as this type of the device used for automobile suspension system developing vibration damping performances, some of the inventors have already proposed a vibration damping device in U.S. patent application Ser. No. 07/570,659 (EPC Application No. 90 30 9175.9) filed on Aug. 21, 1990 in order to solve problems inherent to the well-known shock absorber.

Figure 9:
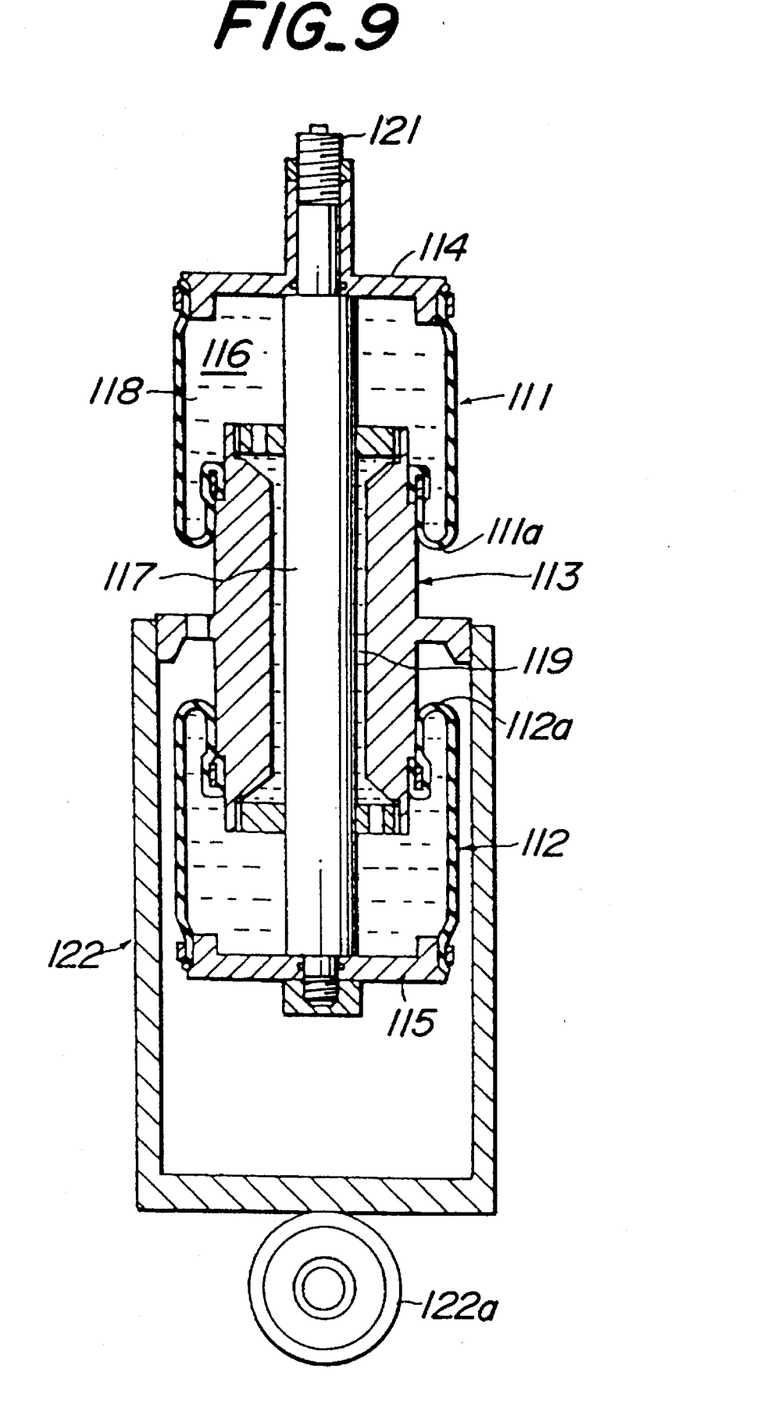
FIG. 9 is a schematically longitudinal section view of the vibration damping device previously proposed by the inventors.

In such a device, as shown by a longitudinal section view in FIG. 9, an end portion of each of two cylindrical and flexible membrane members 111, 112 is liquid-tightly connected to respective end portion of a restricted passage constituting member 113 being substantially cylindrical as a whole, while the other end portions of these membrane members 111, 112 are liquid-tightly connected to face plates 114, 115, respectively, whereby a closed chamber 116 is formed in such a manner that folded portions 111a, 112a of these membrane members 111, 112 face to each other. The face plates 114, 115 are connected to each other through a rod-like rigid member 117 inside the closed chamber 116. In the closed chamber 116, water 118 is filled, for example, inside these membrane members 111, 112 and in a restricted passage 119 formed substantially over a full length of the restricted passage constituting member 113. Furthermore, fastening members 121, 122 are arranged onto the face plate 114 and the restricted passage constituting member 113, respectively. The vibration damping device of this structure can be used, for example, by connecting the male screw-shaped fastening member 121 arranged onto the face plate 114 to a body frame of a vehicle through a rubber bushing and also connecting a cup-shaped fastening member 122 arranged onto an outward flange of the restricted passage constituting member 113 to a lower arm of the vehicle through an eye hook 122a.

When vibrations are input to either side of the face plate and the restricted passage constituting member in such a device, the face plates 114, 115 are relatively displaced to the restricted passage constituting member 113 under the flow of water 118 in the restricted passage 119, whereby vibrations can effectively be damped. Further, when the input vibration is a high frequency microvibration, the cylindrical and flexible membrane members 111, 112 are deformed to absorb volume change inside these membrane members, whereby the high frequency microvibration can effectively be isolated.

However, in order to create a large vibration damping force by such a device, it is required to make a sectional area of the restricted passage 119 small because the length of the restricted passage 119 is naturally restricted by the length of the restricted passage constituting member 113. As a result, there is caused a problem that a fear of contacting of the structural members with each other becomes high.

Furthermore, there has been proposed a modification of the above device in which an electro-theological fluid is filled in the closed chamber 116 instead of water 118 and the rod-like rigid member 117 and the restricted passage constituting member 113 are acted as positive electrode and negative electrode, respectively, to change over a magnification of damping force in accordance with the intensity of electric field applied. In this case, it is favorable, if the vibration damping force is not required, that it approaches to zero as far as possible, while if the vibration damping force is required, it is made large as far as possible. However, in order to ensure an occurrence of large vibration damping force, there is a problem that when the length of the restricted passage 119 is made long to reduce the sectional area of the passage, the damping force becomes unpractically large even in the absence of electrical field.

SUMMARY OF THE INVENTION

It is, therefore, an object of the invention to provide a vibration damping device satisfactorily solving the above problems.

In the vibration damping device according to a first aspect of the invention, an end portion of each of two cylindrical and flexible membrane members is liquid-tightly connected to each of both end portions of a piston member. The other end portions of these membrane members are liquid-tightly connected to respective face plates, respectively, while these face plates are connected to each other through a connecting member provided with a restricted passage, whereby a closed chamber is formed at such a state that folded portions of these membrane members face to each other. Furthermore, a liquid is filled in the closed chamber, while fastening members are arranged onto the piston member and face plate, respectively. Preferably, the connecting member for connecting the face plates to each other is arranged to pass through the piston member.

In the device according to a second aspect of the invention, both the face plates are connected to each other through a connecting member provided with plural restricted passages, while an electrorheological fluid is filled in the closed chamber and further electrodes having different polarizations are arranged onto opposed partition walls in each of the restricted passages.

In the device according to a third aspect of the invention, plural restricted passages are formed in the piston member liquid-tightly connecting each end portion of two cylindrical and flexible membrane members and both the face plates are connected to each other through the connecting member inside or outside the closed chamber, while an electrorheological fluid is filled in the closed chamber and electrodes having different polarizations are arranged onto opposed partition walls in each of the restricted passages.

BRIEF DESCRIPTION OF THE DRAWING

The invention will be described with reference to the accompanying drawings, wherein.

DESCRIPTION OF THE PREFERRED EMBODIMENTS

In the first embodiment according to the invention, the vibration damping force is created by the flow of the liquid through he restricted passage arranged in the connecting member for connecting the face plates to each other. Furthermore, the length of the restricted passage can be lengthened as compared with that of the previously proposed device, and also the fear of contacting the structural parts with each other can be completely removed even when the sectional area of the restricted passage is sufficiently made small, whereby the excellent vibration damping performance can always be developed.

When vibrations are transmitted, for example, to the side of the face plate at a state of mounting the device onto a vehicle or the like, if they are high frequency microvibrations, a slight change of volume inside the cylindrical and flexible membrane member due to the deformation inherent to the membrane member, particularly its elastic deformation can sufficiently absorbed under a small deformation resistance, so that the high frequency microvibration can effectively be isolated from the piston member.

On the other hand, when the transmitted vibration is relatively large in the amplitude, the connecting member for connecting both the face plates to each other can be sufficiently smoothly and effectively displaced relative to the piston member under a small deformation resistance even when the connecting member is arranged inside or outside the closed chamber. Thus, the internal pressure of one of the two membrane members is reduced and the internal pressure of the other membrane member is increased by an amount corresponding to the above reduced amount in accordance with the relative displacement of the connecting member, so that the liquid filled in the closed chamber flows from high pressure side toward low pressure side through the restricted passage and consequently the excellent vibration damping performance is always obtained irrespectively of the magnification of vibration force.

Since the folded portions of the two cylindrical and flexible membrane members are positioned to face to each other, the acceptable amount of relative displacement between the piston member and the connecting member can sufficiently be increased under an action of the long restricted passage as compared with the case that the folded portions are separated far away from each other (as disclosed, for example, in Japanese patent laid open No. 60-81529), whereby the development of higher vibration damping performance can be ensured.

In the second device according to the invention, the electrorheological fluid is used as a filled liquid and can be passed through plural restricted passages formed in the connecting member, whereby the total sectional area of the restricted passages becomes considerably large as compared with that of the previously proposed device even when the length of each of the restricted passages is longer than that of the proposed device, so that when the electrical field is absent in the restricted passages, the electrorheological fluid can smoothly flow in the restricted passages under a small flowing resistance and consequently the vibration damping force can considerably be decreased.

On the contrary, when the electrical field is created in the restricted passages by the action of electrodes arranged onto the opposed walls of each of the restricted passages, the viscosity of the electrorheological fluid is increased in accordance with the intensity of the electrical field over the full length of each restricted passage, so that the desired large vibration damping force can be produced in each of the restricted passages likewise the case that the total length of the restricted passages is made long and hence the damping force can sufficiently be made large.

In the third device according to the invention having plural restricted passages formed in the piston member, the length of each of the restricted passages is shorter than that of the second device and also the sectional area of the passage becomes larger than that of the previously proposed device, so that the vibration damping force in case of no electrical field can be further decreased as compared with that of the second device, while the viscosity of the electrorheological fluid is increased by the action of each restricted passage in the presence of the electrical field. Thus, the vibration damping force can also sufficiently be increased likewise the case that the total length of the restricted passages is made long.

Figure 1A:
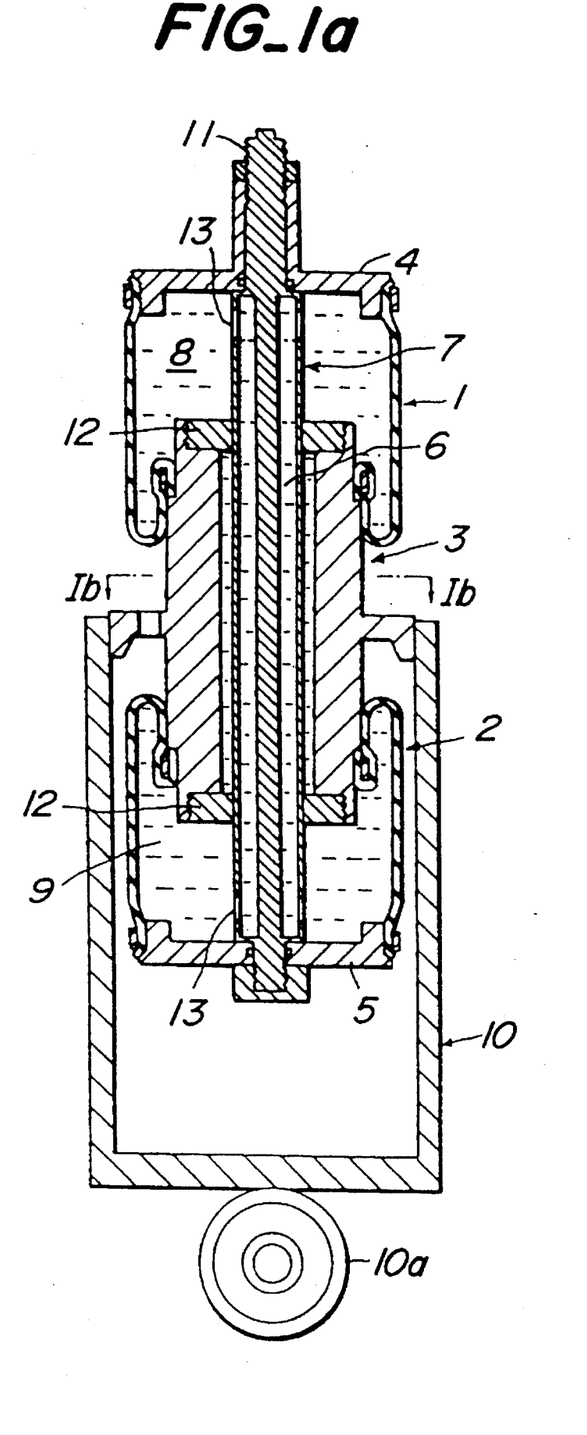
FIGS. 1a and 1b are longitudinal and lateral section views f a first embodiment of the vibration damping device according to the invention, respectively.
Figure 1B:
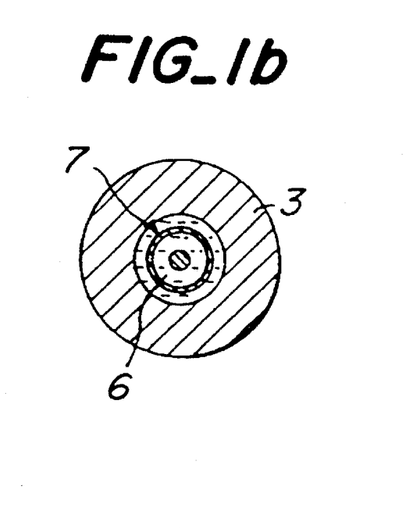

In FIGS. 1a and 1b is longitudinally and laterally shown a section of the first embodiment of the vibration damping device according to the invention. The numerals 1, 2 are cylindrical and flexible membrane members, respectively and numeral 3 a piston member liquid-tightly connecting an end portion of each of these membrane members 1, 2.

The other end portions of these membrane members 1, 2 are liquid-tightly connected to respective face plates 4, 5 in the same manner as described in the previously proposed device, while these face plates 4, 5 are connected to each other through a connecting member 7 provided with a restricted passage 6 having a given sectional area. Thus, a closed chamber 8 is formed so as to face folded portions of these membrane members 1, 2 to each other. A liquid 9 such as water, anti-freeze or the like is filled in the closed chamber, and further a cup-shaped fastening member 10 is arranged onto the outer face of the piston member 10 through an outward flange and a fastening member 11 is arranged onto one (4) of the face plates.

In this case, the cup-shaped fastening member 10 arranged onto the piston member 3 is provided at its outer bottom face with an eye hook 10a, and the other fastening member 11 has a male screw portion integrally united with the connecting member 7.

In such a vibration damping device, the connecting member 7 may be arranged outside the closed chamber 8. In order to miniaturize the device, it is preferable that the connecting member 7 is arranged inside the closed chamber 8 by passing through the piston member 3 as shown in FIG. 1a. In the latter case, the sliding movement of the connecting member 7 to the piston member 3 is guided through guide members 12 attached to upper and lower end portions of the piston member 3, whereby the movement of the connecting member can be smoothened and also the contact between the connecting member 7 and the piston member 3 can favorably be prevented.

Moreover, it is not required to liquid-tightly seal the gap between the guide member 12 and the connecting member 7. Hence the close fitting between these members can be avoided, so that it is possible to move the connecting member 7 through a small force.

Although the shape of the restricted passage 6 in the connecting member is cylindrical for producing a given sectional area, the shape may be changed into rectangular cylinder and other proper profile cylindrical shapes, if necessary. In any case, the restricted passage 6 is opened to the inside of each of the membrane members 1, 2 through holes 13 formed in upper and lower end portions of the connecting member 7, whereby the flowing of the liquid 9 filled in the closed chamber 8 into the restricted passage 6 is ensured.

According to the vibration damping device of the above structure, the length of the restricted passage 6 can be made longer than that of the previously proposed device, and also the the fear of contacting the members with each other c n completely be removed even when the sectional area of the passage is a small value, whereby the vibration damping performance of the device can be improved as being expected without any inconvenience. Furthermore, even when vibration input to the side of the face plate or the piston member in this device are high frequency microvibrations or not, they are effectively isolated by the same action as in the previously proposed device and can very effectively be damped.

In the device of FIG. 1, an electrorheological fluid may be filled instead of the liquid 9 with water, anti-freeze or the like. In this case, as shown in FIG. 2, the electrorheological fluid 14 is filled in the closed chamber 8, while the entire of core portion of the connecting member 7 acts as a positive electrode 15 and the whole of sheath portion thereof is acts as a negative electrode 16 and these electrodes 15, 16 are isolated by an insulative material 17 such as synthetic resin, ceramic or the like arranged therebetween.

Figure 2:
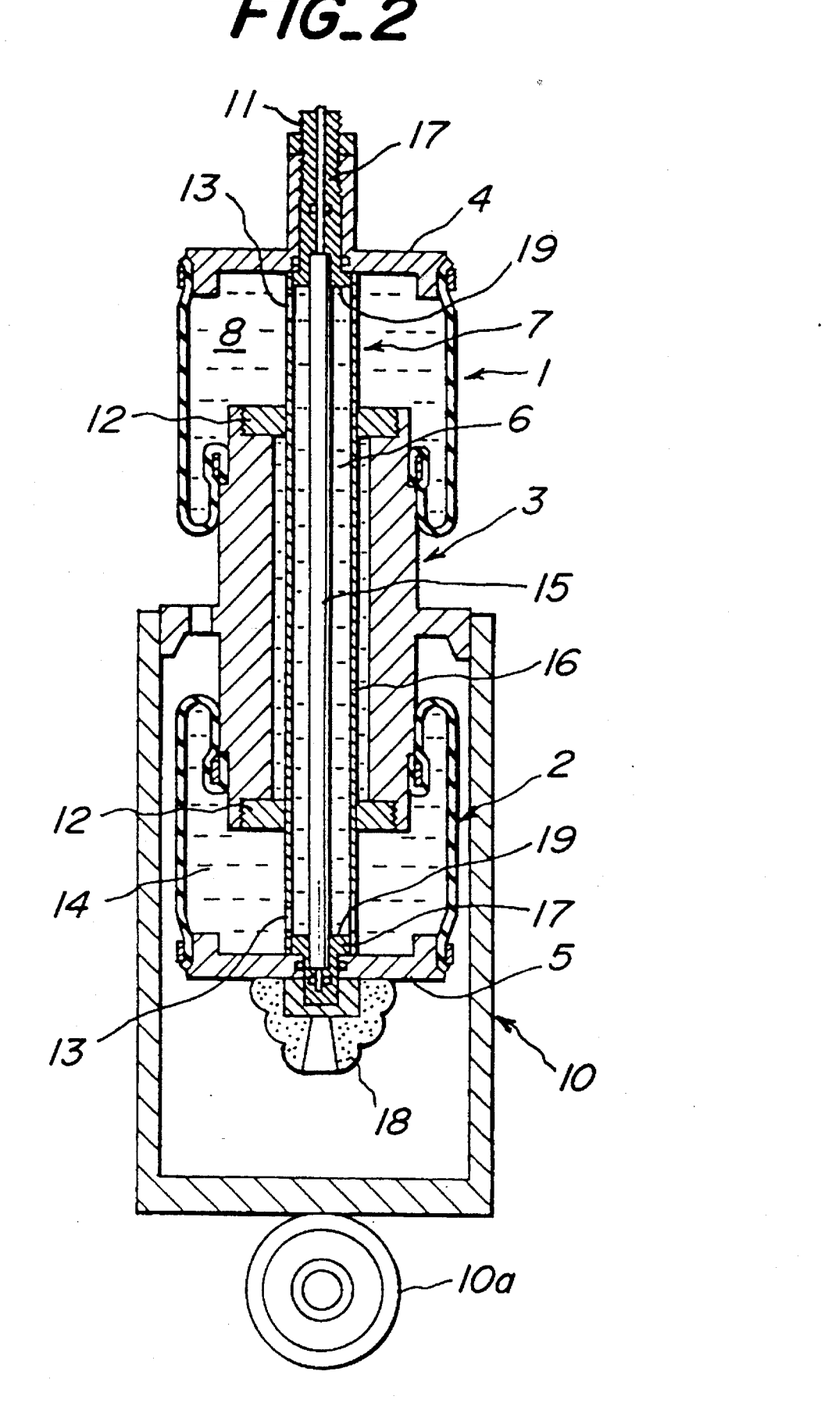
FIG. 2 is a longitudinal section view showing an application of electrorheological fluid to the device shown in FIG. 1.

As shown in FIG. 2, the end face of the negative electrode 16 comes into contact With each of the face plates 4, 5 usually made from a metallic material, so that the positive electrode 15 is also isolated from the face plates 4, 5 through the insulative material 17.

Further, a portion of the connecting member 7 around the face plate 5 is covered with a stopper 18 preferably made from an elastic material in order to protect the collision of such a portion with the cup-shaped fastening member 10.

In the vibration damping device of FIG. 2, when the electrical field is absent between these electrodes, the same vibration damping performance as in the device of FIG. 1 can be developed. Further, when the electrical field is generated between the electrodes, the viscosity of the electrorheological fluid 14 is increased in accordance with the intensity of the electrical field, so that the given large vibration damping force can be developed by selecting the intensity of the electrical field.

In this device, in order to further increase the vibration damping force in the presence of the electrical field, it is considered to increase the voltage applied between the electrodes 15, 16 or to narrow the distance between the electrodes to increase the intensity of electrical field. According to the latter case, a fear of causing electric discharge at a contact face between the insulative material 17 and the electrorheological fluid 14 becomes high, or there is a fear that air incorporated in the filling of the electrorheological fluid retains between the upper insulative material 17 and the electrorheological fluid 14 to cause electric discharge.

Figure 3A:
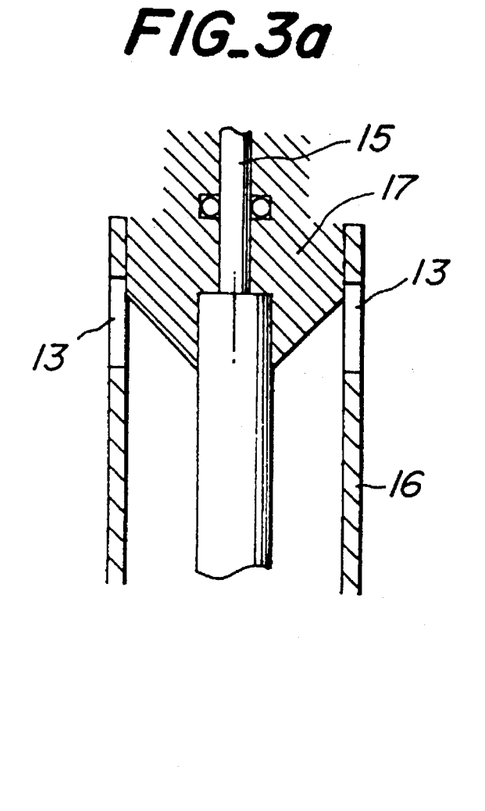
FIGS. 3a, 3b and 3c are schematically sectional views of the main part of the device of FIG. 2 showing various it structures of insulative material, respectively.
Figure 3B:
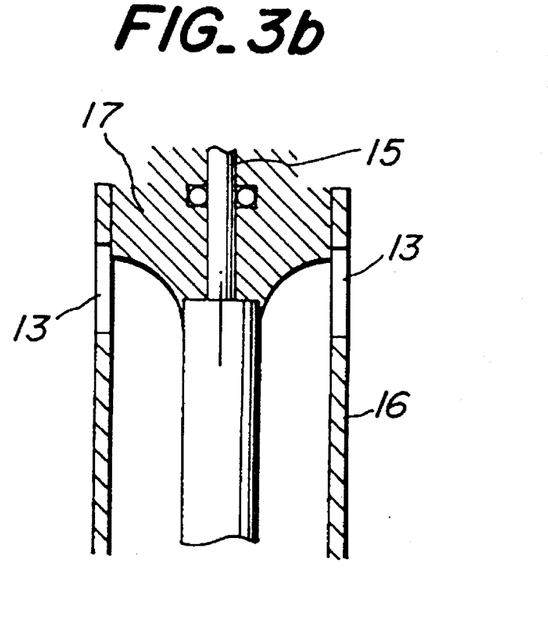
Figure 3C:
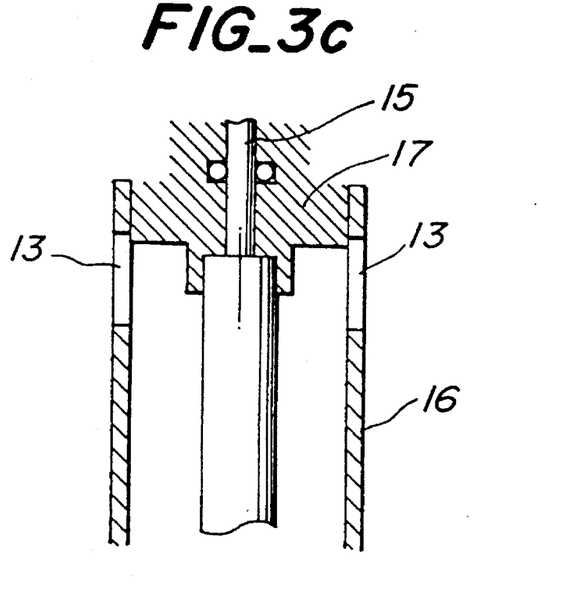

For this end, if it is required to narrow the distance between the electrodes, as shown with respect to a main part of the upper insulative material in FIGS. 3a to 3c, the central portion of the insulative material 17 is protruded downward in form of straight, curve or step. Thus the distance of the surface of the insulative material contacting with the electrorheological fluid 14 from the positive electrode 15 or the negative electrode 16 is made sufficiently long to effectively prevent electric discharge along the surface of the insulative material. At the same time, the upper edge of the hole 13 formed in the negative electrode 16 is positioned at the same level as the contact edge position of the insulative material 17 or upward at a level higher than the above level to ensure smooth discharge of air incorporated in the restricted passage toward the outside of the passage, whereby the occurrence of electric discharge phenomenon through air layer is advantageously prevented.

Although the structure of the insulative material has been described with respect to the upper insulative material 17, the lower insulative material is also constituted in the same manner as described above, whereby electric discharge can more effectively be prevented.

Moreover, the central portion of the insulative material 17 may naturally take a proper protruded shape other than the above illustrated shapes, and also the above structure of the insulative material 17 may be applied to devices having a relatively wide distance between electrodes.

Figure 4:
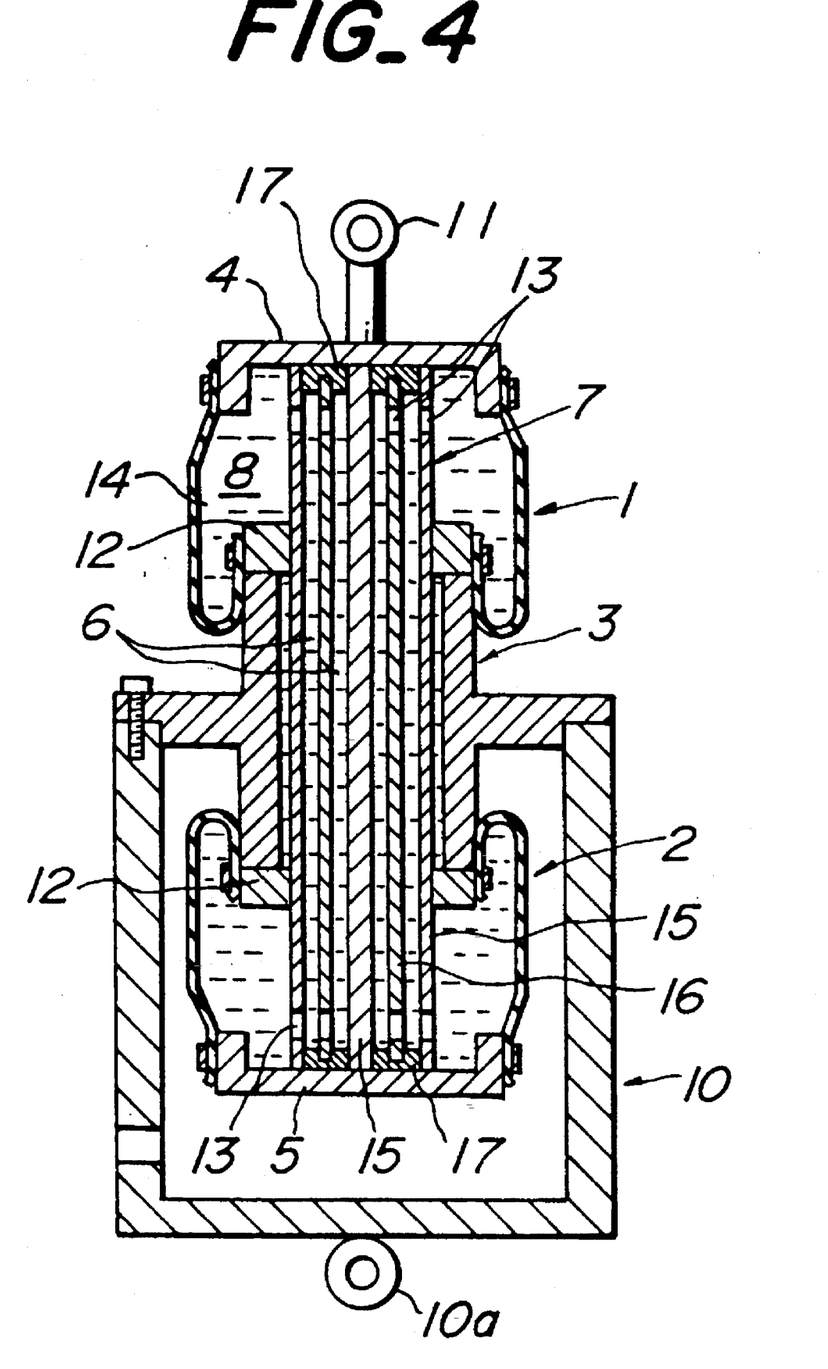
FIG. 4 is a longitudinal section view of a second embodiment of the vibration damping device according to the invention.
Figure 5A:
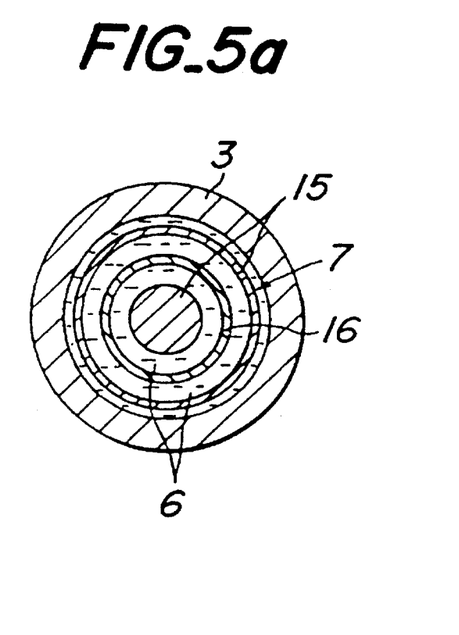
FIGS. 5a, 5b, and 5c are lateral section views showing various embodiments of the restricted passage, respectively.
Figure 5B:
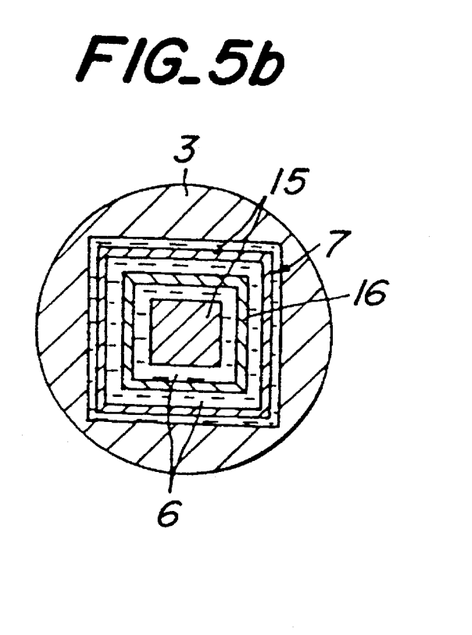
Figure 5C:
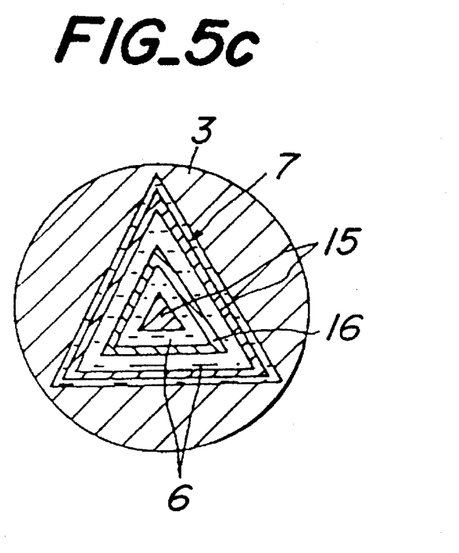
Figure 5D:
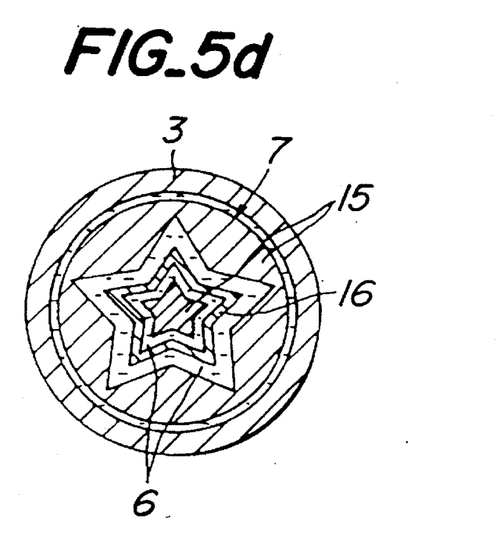

FIG. 4 shows a longitudinal section of a second embodiment of the vibration damping device according to the invention. In this device, the electrorheological fluid 14 is filled in the closed chamber 8, while plural restricted passages, two restricted passages 6 in the illustrated embodiment are formed in the connecting member 7 connecting both face plates 4, 5 to each other and the full opposed walls of each of the restricted passages 6 act as positive and negative electrodes 15, 16, respectively.

The formation of two restricted passages 6 in the connecting member 7 can be carried out by arranging an intermediate cylinder serving as a negative electrode 16 around a core member serving as a positive electrode 15 and further enclosing the intermediate cylinder with an outer cylinder serving as a positive electrode 15 as sectionally shown, for example, in FIGS. 5a to 5d. Each of the thus formed restricted passages 6 takes circular, rectangular, triangular, star-shaped form or the like in accordance with the outer profiles of the cylinder and core member, in which the flow of the electrorheological fluid may be made through holes 13 formed in the intermediate cylinder and the outer cylinder.

Moreover, the restricted passage 6 may take polygonal shape, irregular shape or the like other than the above illustrated shapes. Also the number of the restricted passages may properly be increased, if necessary.

In such a device, the total sectional area of the restricted passages can sufficiently be increased irrespectively of the length of each restricted passage, so that the electrorheological fluid 14 can flow very smoothly in the restricted passages in case of no electrical filed and hence the damping performance against vibrations transmitted to the device can largely be reduced. On the other hand, when the given intensity value of electrical field is applied to each of the restricted passages 6 under an influence of the electrodes 15, 16, the viscosity of the electrorheological fluid 14 in the restricted passage 6 is increased as expected and a large flowing resistance is applied to the electrorheological fluid 14 likewise the case that the total length of the restricted passages is made long, whereby very high vibration damping performance can be developed.

Figure 6A:
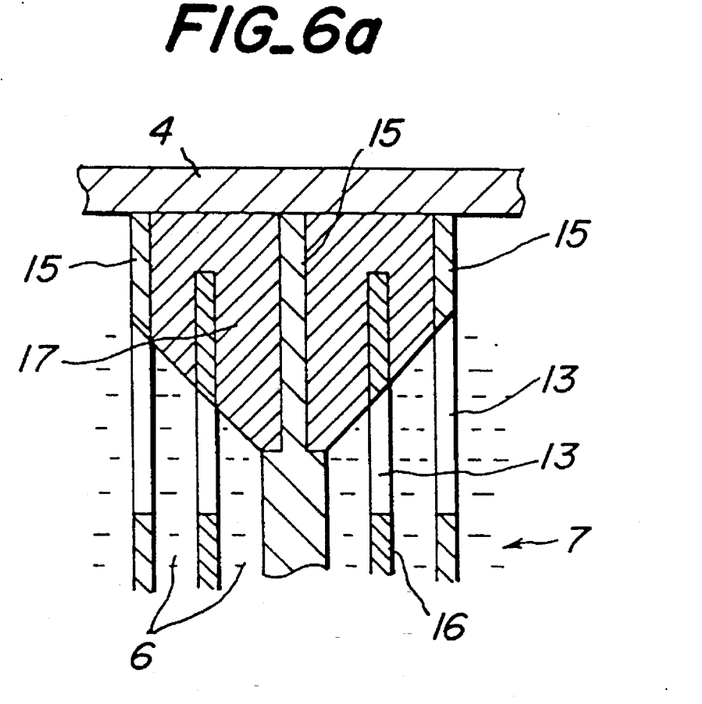
FIGS. 6a and 6b are schematically sectional views of the main part of the device of FIG. 4 showing various structures of insulative material respectively.
Figure 6B:
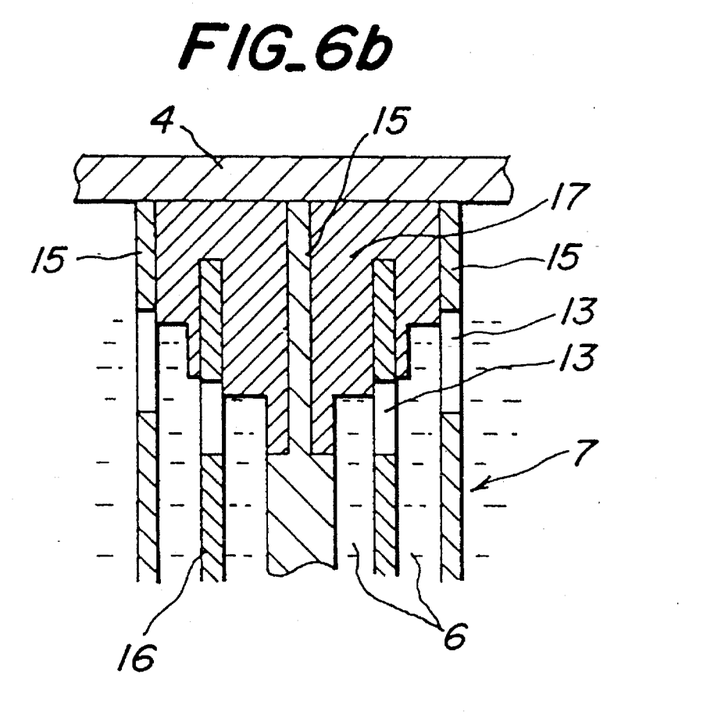

In FIGS. 6a and 6b are shown preferred embodiments of the structure of the upper-side insulative material 17 in the above device. That is, the central portion of the insulative material 17 protrudes downward in a straight or step form in its section, whereby the surface distance of the insulative material 17 is prolonged between the positive electrode 15 and the negative electrode 16 to effectively prevent electric discharge along the surface of the insulative material 17.

In addition, the upper edges of the holes 13 formed in the positive and negative electrodes 15, 16 are located at an edge position of the insulative material 17 or upward at a level higher than the above position for bringing about smooth discharge of air incorporated in the restricted passages outward the passages, whereby electric discharge through air layer is sufficiently prevented.

Moreover, the prevention of electric discharge is more effective by applying the above structure of the insulative material 17 to lower-side insulative material 17.

In any case, the protruded shape of the insulative material 17 may variously be changed, if necessary.

Figure 7A:
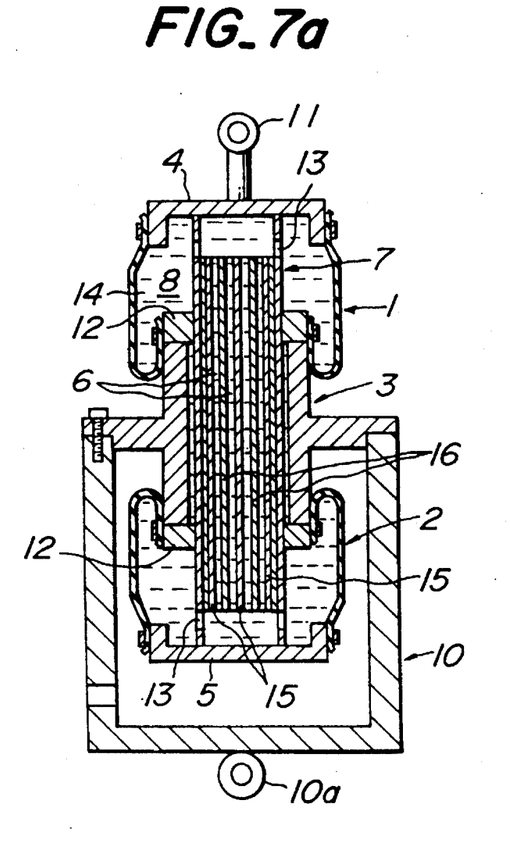
FIG. 7a is a modified embodiment of the device of FIG. 4 and FIGS. 7b, 7c and 7d are lateral section views of the device of FIG. 7a showing various embodiments of the restricted passage, respectively.

FIG. 7a shows a modified embodiment of the device shown in FIG. 4, in which plate members serving as positive and negative electrodes 15, 16 are alternately extended inside the connecting member 7 in an axial direction of the connecting member 7 to form four restricted passages 6 having straight, zigzag or pulse shape viewed from its lateral section. The same function and effect as in the previous embodiment can be achieved by such restricted passages.

Figure 7B:
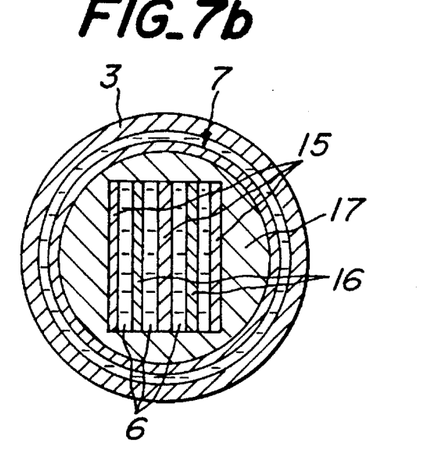
Figure 7C:
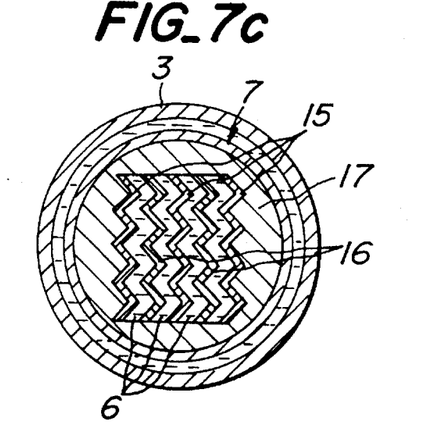
Figure 7D:
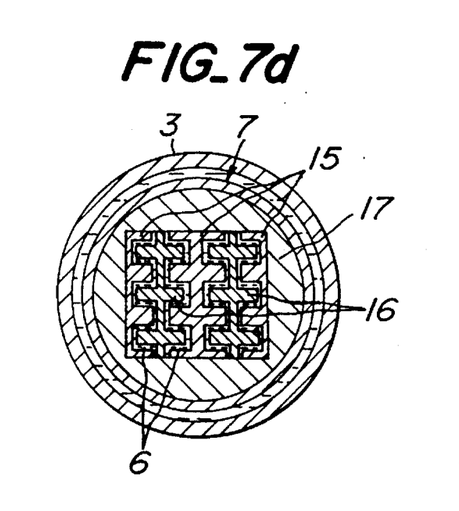

In this case, it is preferred that each of the plate members contributing to the formation of the restricted passages 6 is fixed by the insulative material 17 enclosing these plate members as shown in FIGS. 7b to 7d.

Figure 8:
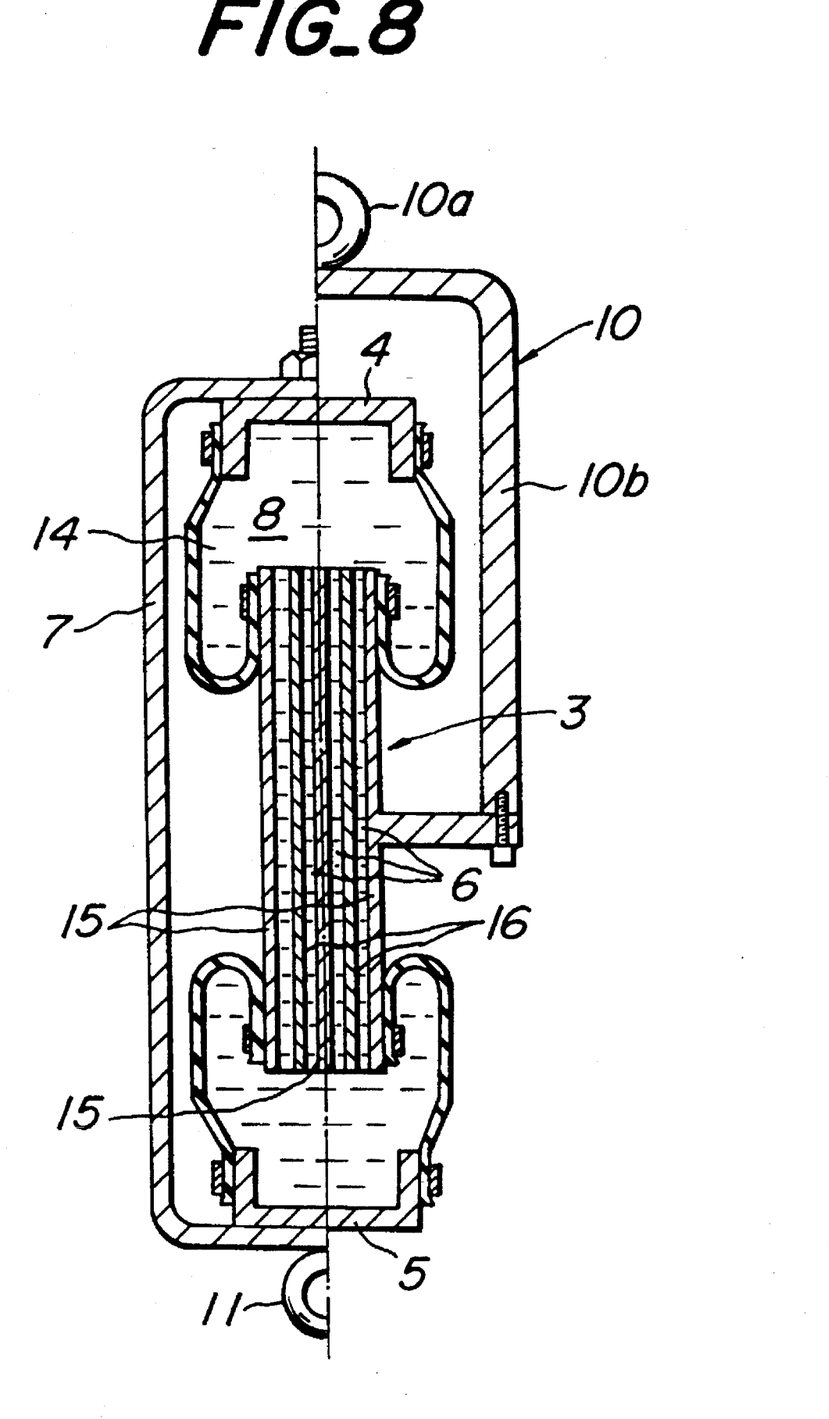
FIG. 8 is a longitudinal section view of a third embodiment of the vibration damping device according to the invention.

FIG. 8 shows a longitudinal section of a third embodiment of the vibration damping device according to the invention.

In the illustrated embodiment, plural restricted passages 6 are formed in the piston member 3, while both the face plates 4, 5 are connected to each other through the connecting member 7 arranged outside the closed chamber 8. The connecting member 7 is a rectangular frame as a whole, and the fastening member 11 attached thereto is comprised of an eye hook as in the embodiments of FIGS. 4 and 7. Furthermore, the other fastening member 10 is attached to arms projecting from opposed positions of the piston member 3 in the radial direction thereof and is comprised of a substantially inverted U-shaped frame 10b as a whole and an eye hook 10a attached to the frame 10b.

The restricted passage 6 in this embodiment may be formed as shown in FIGS. 5 and 7. In case of the cylindrical restricted passage 6 as shown in FIG. 5, it is necessary that each of the core member and the intermediate cylinder are fixed to the outer cylinder with an insulative fixing means without obstruction of flowing the electrorheological fluid 14 into each restricted passage 6, whereby the leaving out of the core member and intermediate cylinder from the outer cylinder is prevented.

The mutual connection of the face plates 4, 5 in the closed chamber can be attained, for example, by directly connecting a core member capable of relatively displacing in an axial direction of the both cylinders or a central plate member capable of relatively displacing in a longitudinal direction of the other plate member to the face plates 4, 5 as shown in FIGS. 5 and 7.

In the device of the illustrated embodiment, the vibration damping force can considerably be reduced in case of no electrical field, or the vibration damping force can largely be increased in case of applying a given intensity of electrical field by serving the opposed walls of each of the restricted passages 6 as positive and negative electrodes 15, 16, respectively, likewise the aforementioned embodiments.

As mentioned above, according to the invention, when the electrorheological fluid is not used, the length of the restricted passage is made long and also the sectional area thereof is sufficiently decreased. Thus the excellent vibration damping performance can always be developed, while when the electrorheological fluid is used, the vibration damping force can be decreased as far as possible in case of no electrical field and the very large vibration damping force can be developed when the given intensity value of electrical filed is existent likewise the case that the total length of the restricted passages is long.

What is claimed is:

1. A vibration damping device comprising; two cylindrical, rolling lobe type flexible membrane members, an end portion of each of said membrane members being liquid-tightly connected to a respective end portion of a piston member and the other end portions of said membrane members being liquid-tightly connected to respective face plates, a connecting member provided therein with plural restricted passages and connecting the face plates to each other to form a closed chamber at such a state that folded lobe portions of the membrane members face each other in an axial direction, an electrorheological fluid in the closed chamber, electrodes arranged onto opposed walls in each of the restricted passages, and fastening members arranged onto the piston member and face plates, respectively.

2. The vibration damping device of claim 1, wherein said plural restricted passages are concentric chambers.

3. The vibration damping device of claim 2 further comprising communication channels in said connecting member to provide fluid communication to adjacent concentric chambers.

4. The vibration damping device of claim 1 further comprising an insulator positioned at end potions of said piston to isolate said electrodes.

5. The vibration damping device of claim 4, wherein said insulator protrudes from said end plate in a tapered manner.

6. A vibration damping device comprising; two cylindrical, rolling lobe type flexible membrane members, an end portion of each of said membrane members being liquid-tightly connected to a respective end portion of a piston member provided therein with plural restricted passages and the other end portions of said membrane members being liquid-tightly connected to respective face plates to form a closed chamber such that folded lobe portions of the membrane members face each other in an axial direction, a connecting member connecting the face plates to each other inside the closed chamber, an electrorheological fluid in the closed chamber, electrodes arranged onto opposed walls in each of the restricted passages, and fastening members arranged onto the piston member and face plates, respectively.

7. The vibration damping device of claim 6, wherein said restricted passages extend inside said piston in parallel with each other.

8. The vibration damping device of claim 6, wherein said folded portions of said membrane members do not laterally deflect when said piston member moves axially.

9. A vibration damping device comprising; two cylindrical, rolling lobe type flexible membrane members, an end portion of each of said membrane members being liquid-tightly connected to a respective end portion of a piston member provided therein with plural restricted passages and the other end portions of said membrane members being liquid-tightly connected to respective face plates to form a closed chamber such that folded lobe portions of the membrane members face each other in an axial direction, a connecting member connecting the face plates to each other outside the closed chamber, an electrorheological fluid in the closed chamber, electrodes arranged onto opposed walls in each of the restricted passages, and fastening members arranged onto the piston member and face plates, respectively.

10. A vibration damping device comprising; two cylindrical, rolling lobe type flexible membrane members, an end portion of each of said membrane members being liquid-tightly connected to a respective end portion of a piston member and the other end portion of said membrane members being liquid-tightly connected to respective face plates, a connecting member provided therein with plural restricted passages and connecting the face plates to each other to form a closed chamber at such a state that folded lobe portions of the membrane members face each other in an axial direction and said connecting member being arranged so as to pass through the piston member, an electrorheological fluid filled in the closed chamber, an electrode arranged on an opposed wall to said restricted passages, and fastening members arranged onto the piston member and face plates, respectively.

11. A vibration damping device as in claim 10 wherein said connecting member comprises a hollow cylinder and an axial rod therein, one electrode comprising said cylinder and a second electrode comprising said axial rod.

12. A vibration damping device as in claim 11 further comprising insulators isolating said hollow cylinder from said face plates.

13. A vibration damping device as in claim 11 wherein said connecting member comprises a second hollow cylinder concentric with said axial rod and at least one restricted passage placed in a wall of said second hollow cylinder.

14. A vibration damping device as in claim 10 wherein said restricted passages are axially spaced from each other.

15. A vibration damping device as in claim 10 further comprising an insulator to electrically isolate said one electrode from said second electrode.

16. A vibration damping device as in claim 15 wherein said insulator partially overlaps at least one of said restricted passages.

* * * * *